(12) United States Patent
Weingarten

(10) Patent No.: US 7,455,279 B2
(45) Date of Patent: Nov. 25, 2008

(54) HYDRAULIC CONTROL VALVE WITH INTEGRATED DUAL ACTUATORS

(75) Inventor: Zvi Weingarten, Kibbutz Evron (IL)

(73) Assignee: Bermad CS, Ltd, Kibbutz Evron (IL)

( * ) Notice: Subject to any disclaimer, the term of this patent is extended or adjusted under 35 U.S.C. 154(b) by 0 days.

(21) Appl. No.: 11/159,186

(22) Filed: Jun. 23, 2005

(65) Prior Publication Data

US 2006/0289816 A1    Dec. 28, 2006

(51) Int. Cl.
*F16K 31/00*  (2006.01)
*F16K 1/00*  (2006.01)
*F01B 21/02*  (2006.01)

(52) U.S. Cl. .................. 251/63.6; 251/331; 251/62; 92/64

(58) Field of Classification Search ............ 251/63, 251/63.5, 63.6, 62, 331; 60/402; 92/62, 92/64
See application file for complete search history.

(56) References Cited

U.S. PATENT DOCUMENTS

| | | | | | |
|---|---|---|---|---|---|
| 2,487,089 | A | * | 11/1949 | Anthes | 137/489.5 |
| 2,806,481 | A | * | 9/1957 | Faust | 137/116.5 |
| 3,187,640 | A | * | 6/1965 | Young et al. | 92/48 |
| 3,446,241 | A | * | 5/1969 | Skoli | 137/553 |
| 3,696,711 | A | * | 10/1972 | Berg et al. | 92/48 |
| 3,759,147 | A | * | 9/1973 | Johnsson et al. | 92/19 |
| 3,920,185 | A | * | 11/1975 | Kwok | 239/99 |
| 4,061,080 | A | * | 12/1977 | Sundstrom | 92/13.2 |
| 5,348,036 | A | | 9/1994 | Oksanen | |
| 6,244,563 | B1 | * | 6/2001 | Ejiri | 251/63.6 |
| 6,250,605 | B1 | * | 6/2001 | Young | 251/291 |
| 2002/0175309 | A1 | * | 11/2002 | Vernia | 251/331 |

OTHER PUBLICATIONS

Singer Valve Inc. Catalogue Entry For Model 106-PGM pp. 25-28.

* cited by examiner

*Primary Examiner*—John Rivell
*Assistant Examiner*—Andrew J Rost
(74) *Attorney, Agent, or Firm*—Mark M. Friedman (57) ABSTRACT

The dual actuator valve of the present invention deploys both the primary and secondary actuator elements in a single, common control chamber. Therefore, the present invention provides a dual actuator valve having dimensions that are the same as, or similar to, the dimensions of a single actuator control valve. It will be appreciated that the actuator elements may be of diaphragm type or piston type actuator elements. The primary actuator element is mechanically linked to the valve plug and regulates the flow though the valve, while the secondary actuator element remains in a fully open position. Should the primary actuator element fail to operate the valve due, for example, to diaphragm rupture, failure of the primary control system, or any other reason, the secondary control system activates the secondary actuator element, which then effects movement of the primary actuator element thereby resuming flow regulation or closure of the valve as necessary.

22 Claims, 6 Drawing Sheets

PRIOR ART

HYDRAULIC CONTROL VALVE WITH INTEGRATED DUAL ACTUATORS

FIELD AND BACKGROUND OF THE INVENTION

The present invention relates to automatic flow control valves and, in particular, it concerns a control valve with integrated dual actuators in which both of the actuators are deployed in a single, common control chamber.

Automatic control valves are known to utilize piston type actuators, or diaphragm type actuators having either a flat or rolling flexible diaphragm, as the drive mechanism for displacing the valve plug. The sliding piston seals or the flat or rolling diaphragms used are subject to ware and eventual failure due to movement and aging. Failure causes pressure loss from the control chamber, which usually causes the control valve itself to fail to the open position, that is, the main valve member moves to the fully raised position, which causes flow through the valve to increase, with consequent problems arising upstream or downstream depending on the application of the valve. Because the sliding seals or diaphragm are contained within the valve itself and are not visible from the outside, inspection of the seals or diaphragm without dismantling the valve is usually impossible, and thus there is a tendency to replace the seals or diaphragm prematurely rather than risk failure in normal use. Also, the control systems used to control the valves can fail, for example, due to blockage of a conduit with dirt, or failure of the pilot control valve to control properly, and thus in very critical areas preventative maintenance costs can be considerable.

Some valves are designed to fail to the closed position and are termed "fail-safe" valves. While the failure of these valves can prevent damage in some applications, when they fail there is a complete cessation of flow through the valve, which in some applications can create other dangerous situations. Other valves use a parallel duplicate or redundant system in which both systems have some duplicating components which are operative simultaneously, and both are subject to wear, usually at the same rate, and thus are likely to fail at approximately similar moments in time.

Figure 1:
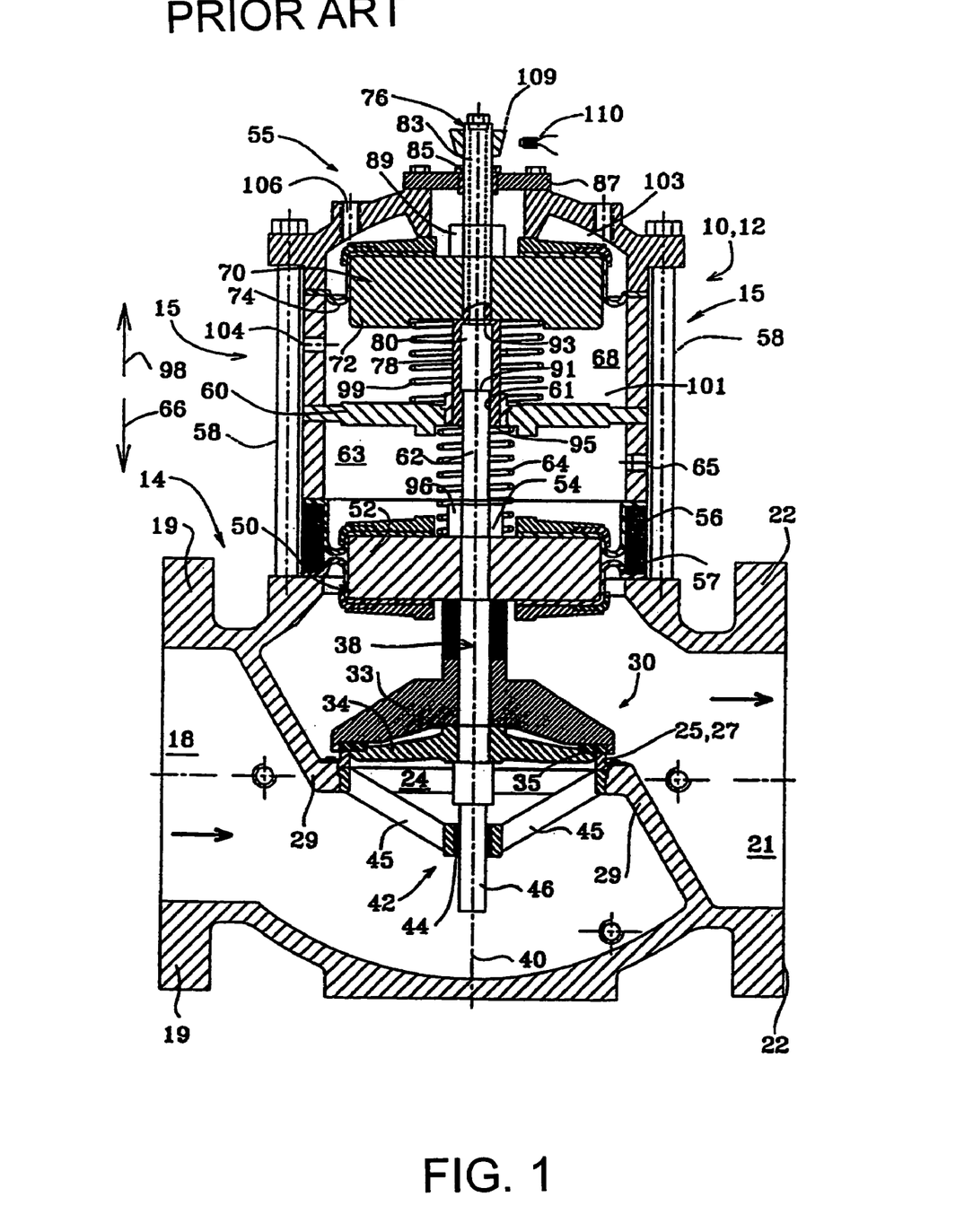
FIG. 1 is prior art from U.S. Pat. No. 5,348,036.
Figure 2:
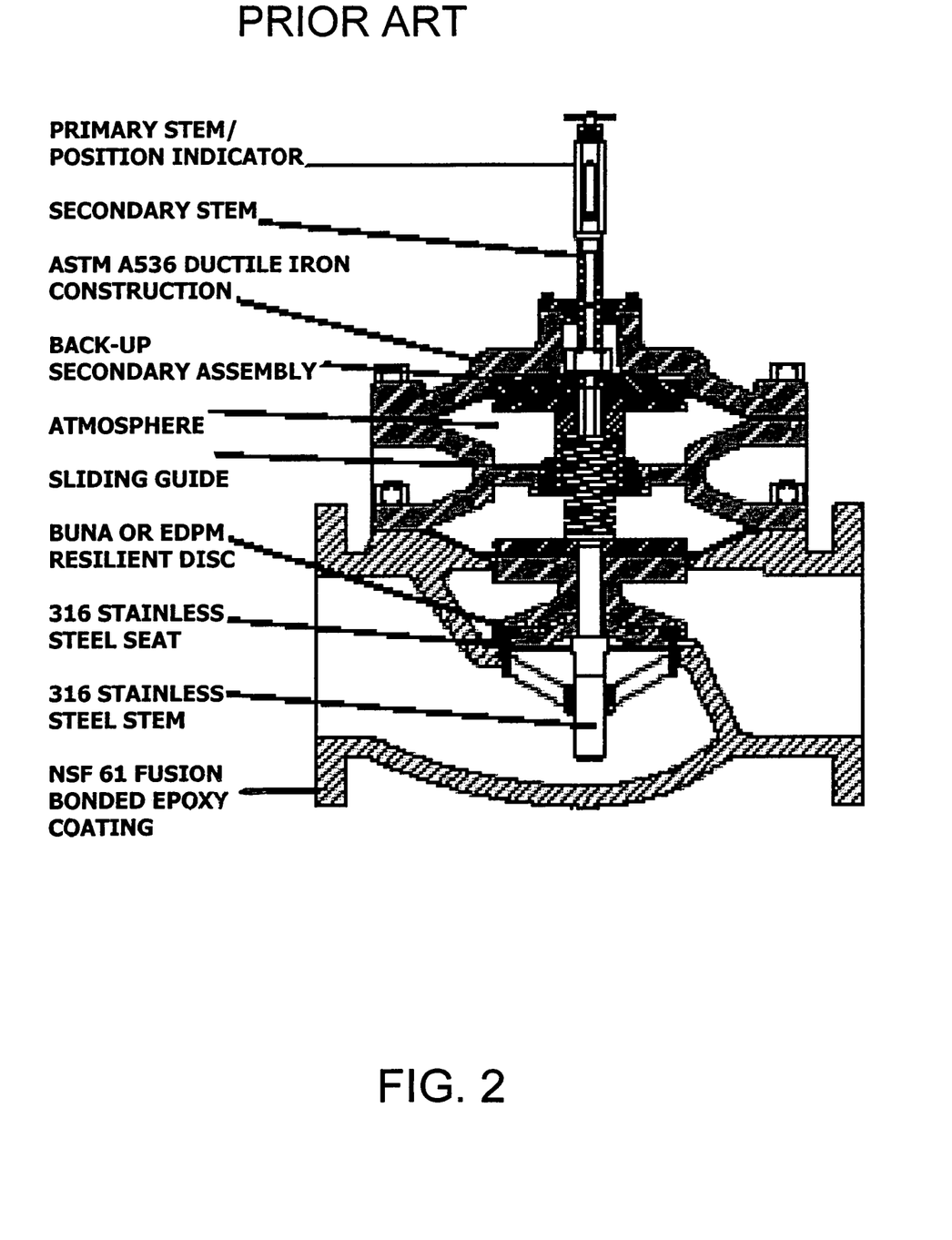
FIG. 2 is prior art from the Singer Valve catalog page 25.

In an attempt to provide a single valve that can maintain "normal" operation after failure of the primary actuator, U.S. Pat. No. 5,348,036, assigned to Singer Valve Inc., discloses a valve having two separate control chambers, each containing a separate actuator configured to interact with a common valve plug. The primary actuator controls displacement of the valve plug during normal operation while the secondary actuator is deployed in a fully open stand-by position. Upon failure of the primary actuator, the secondary actuator is activated so as to continue normal valve function. Essentially, this is an integration of two completely separate actuating systems configured to act upon a common valve plug (see FIG. 1). In fact, the embodiment currently marketed by Singer Valve Inc. does indeed resemble two actuator housings stacked one on the other (see FIG. 2).

Although the Singer valves are more compact and economical than the parallel duplicate or redundant systems, they are still much larger than regular single actuator valves. In addition, maintenance of the Singer valves requires accessing two separate control chambers.

There is therefore a need for a control valve with integrated dual actuators in which both of the actuators are deployed in a single, common control chamber. It would be of benefit if the outer dimensions of the valve were the same as or similar to the dimensions of a valve having a single actuator.

SUMMARY OF THE INVENTION

The present invention is a control valve with integrated dual actuators in which both of the actuators are deployed in a single, common control chamber According to the teachings of the present invention there is provided, a control valve comprising; a) a valve body having an inlet port, an outlet port, and a valve seat disposed between the inlet and outlet ports, the valve seat defining a valve opening to permit fluid communication between the inlet and outlet ports; b) a valve actuator housing extending from the valve body, the valve actuator housing at least partially defining a control chamber, c) a valve plug displaceable between a closed position against the valve seat, and an open position spaced apart from the valve seat, at least a portion of the valve plug extending into the control chamber; d) a primary valve actuating element deployed within the control chamber so as to form a first partition separating first and second pressure control regions within the control chamber, the primary valve actuating element configured to control displacement of the valve plug; and e) a secondary valve actuating element deployed within the control chamber so as to form a second partition separating the second pressure control region and a third pressure control region within the control chamber, the secondary valve actuating element configured to control displacement of the valve plug upon failure of the primary valve actuating element According to a further teaching of the present invention, the primary valve actuating element is mechanically linked to the valve plug, and the secondary valve actuating element is configured so as to effect movement of the primary valve actuating element when the secondary valve actuating element is activated to control displacement of the valve plug According to a further teaching of the present invention, the secondary valve actuating element is deployed in a normally open configuration until the failure of the primary valve actuating element According to a further teaching of the present invention, the primary valve is responsive to pressure differences between the first and second pressure control regions which are controlled by a primary pressure control system, and the secondary valve is responsive to pressure differences between the second and third pressure control regions which are controlled by a secondary pressure control system.

According to a further teaching of the present invention, the secondary pressure control system is activated upon failure of the primary pressure control system.

According to a further teaching of the present invention, the first and second valve actuating elements are diaphragm type actuating elements According to a further teaching of the present invention, the first and second valve actuating elements are attached to the valve actuator housing about a common periphery attachment configuration.

According to a further teaching of the present invention, the valve plug includes a valve plug shaft at least a portion of which extends into the control chamber, and at least a portion of the valve plug shaft is hollow so as to form at least a portion of a pressure control passage configured to supply fluid pressure to the second pressure control region According to a further teaching of the present invention, the first and second valve actuating elements are attached to the valve actuator housing about separate, periphery attachment configurations spaced apart by a diaphragm spacing ring According to a further teaching of the present invention, the diaphragm spacing ring includes least a portion of a pressure control passage configured to supply fluid pressure of the second pressure control region According to a further teaching of the present invention, the first and second valve actuating elements are piston type actuating elements.

According to a further teaching of the present invention, the valve plug includes a valve plug shaft at least a portion of which extends into the control chamber, and at least a portion of the valve plug shaft is hollow so as to from at least a portion of a pressure control passage configured to supply fluid pressure to the second pressure control region There is also provided according to the teachings of the present invention, a control valve comprising. a) a valve body having an inlet port, an outlet port, and a valve seat disposed between the inlet and outlet ports, the valve seat defining a valve opening to permit communication between the inlet and outlet ports; b) a valve actuator housing extending from the valve body, the valve actuator housing at least partially defining at least one of a plurality of pressure control regions; and c) a valve plug displaceable between a closed position against the valve seat to close the valve, and an open position spaced apart from the valve seat to control flow of liquid through the valve opening so as to maintain a desired flow condition through the valve, the valve plug including a valve plug shaft at least a portion of which is hollow so as to form at least a portion of a pressure control passage configured to supply fluid pressure to at least one of the plurality of pressure control region According to a further teaching of the present invention, the plurality of pressure control regions is configured as fist, second and third pressure control regions within a control chamber According to a further teaching of the present invention, there is also provided: a) a primary valve actuating element deployed within the control chamber so as to form a first partition separating first and second pressure control regions within the control chamber, the primary valve actuating element configured to control displacement of the valve plug; and c) a secondary valve actuating element deployed within the control chamber so as to form a second partition separating the second pressure control region and a third pressure control region within the control chamber, the secondary valve actuating element configured to control displacement of the valve plug upon failure of the primary valve actuating element According to a further teaching of the present invention, the first and second valve actuating elements diaphragm type actuating elements According to a further teaching of the present invention, the first and second valve actuating elements are piston type actuating elements There is also provided according to the teachings of the present invention, a method of displacing a valve plug deployed in a valve body, when the valve plug has a valve plug shaft that extends into a control chamber, so as to control the flow of liquid through the valve body, the method comprising: a) dividing the control chamber into first, second and third pressure control regions such that the first and second pressure control regions are separated by a primary valve actuating element, and the second and third pressure control regions are separated by a secondary valve actuating element; b) actuating the valve plug with the primary valve actuating element; and c) actuating the valve plug with the secondary valve actuating element upon failure of the primary valve actuating element According to a further teaching of the present invention, there is also provided supplying pressure to the second pressure control region by a pressure control passage at least partially configured in the valve plug shaft According to a further teaching of the present invention, the dividing the control chamber is accomplished by further providing; a) a primary valve actuating element deployed within the control chamber so as to form a first partition separating first and second pressure control regions within the control chamber; and b) a secondary valve actuating element deployed within the control chamber so as to form a second partition separating the second pressure control region and a third pressure control region within the control chamber According to a further teaching of the present invention, the first and second valve actuating elements are diaphragm type actuating elements According to a further teaching of the present invention, the first and second valve actuating elements are piston type actuating elements

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a control valve with integrated dual actuators in which both of the actuators are deployed in a single, common control chamber.

The principles and operation of control valve according to the present invention may be better understood with reference to the drawings and the accompanying description.

By way of introduction, unlike the dual actuator valves of prior art, in which each actuator is deployed in a separate control chamber (see FIGS. 1 and 2), the dual actuator valve of the present invention, as illustrated in FIGS. 3-6, deploys both the primary and secondary actuator elements in a single, common control chamber. Therefore, the present invention provides a dual actuator valve having dimensions that are the same as, or similar to, the dimensions of a single actuator control valve. It will be appreciated that the actuator elements may be of diaphragm type or piston type actuator elements. As used herein, a dual actuator valve having dimensions that are similar to the dimensions of a single actuator control valve, refers to a valve having a single control chamber whose axial dimension is not more than 50% greater than the range of movement of the primary actuator deployed within the control chamber.

Figure 3:
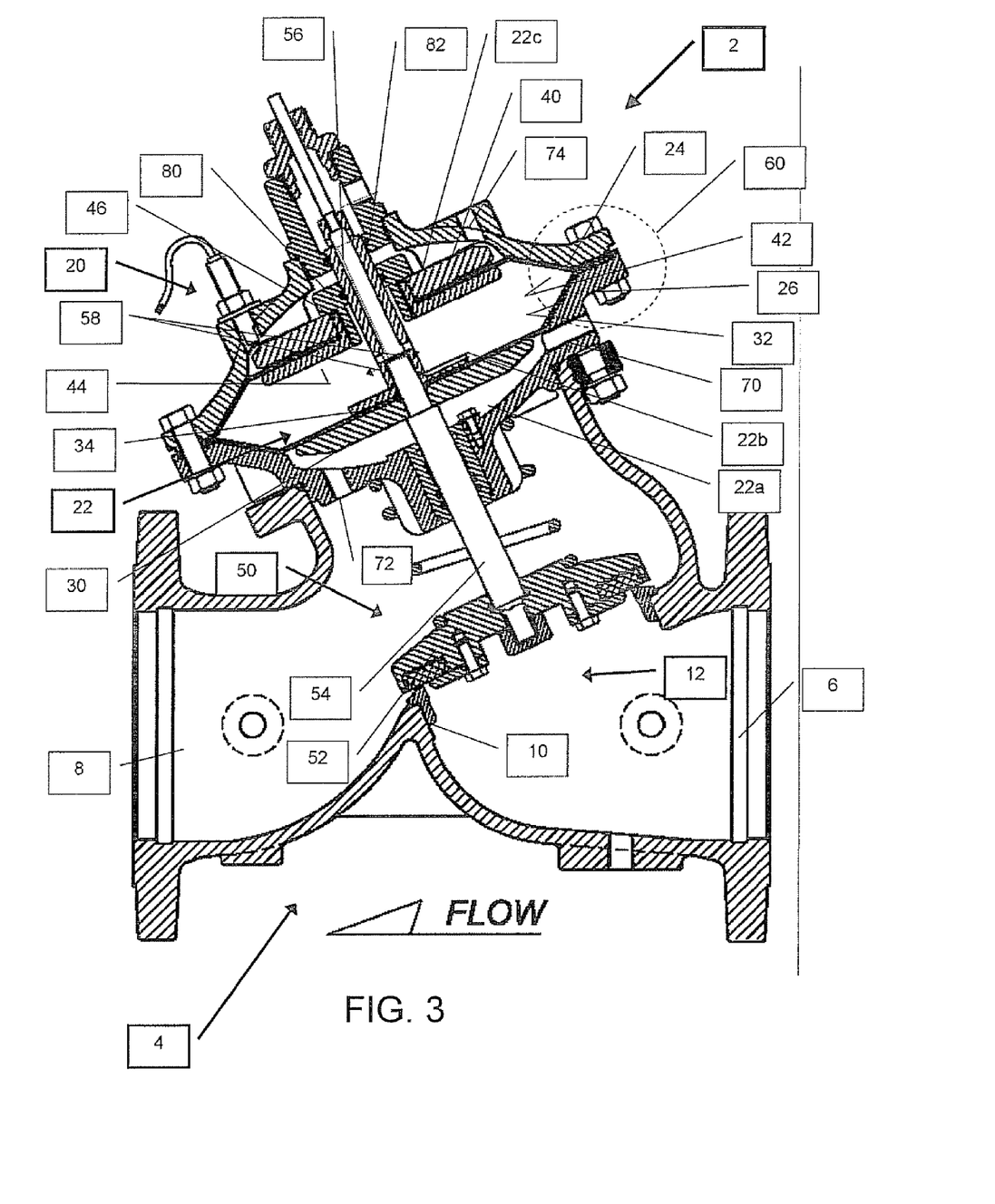
FIG. 3 is a side section of a first embodiment of a control valve with integrated dual actuators constructed and operative according to the teachings of the present invention, shown here with the valve plug controlled by the primary diaphragm actuator.
Figure 4:
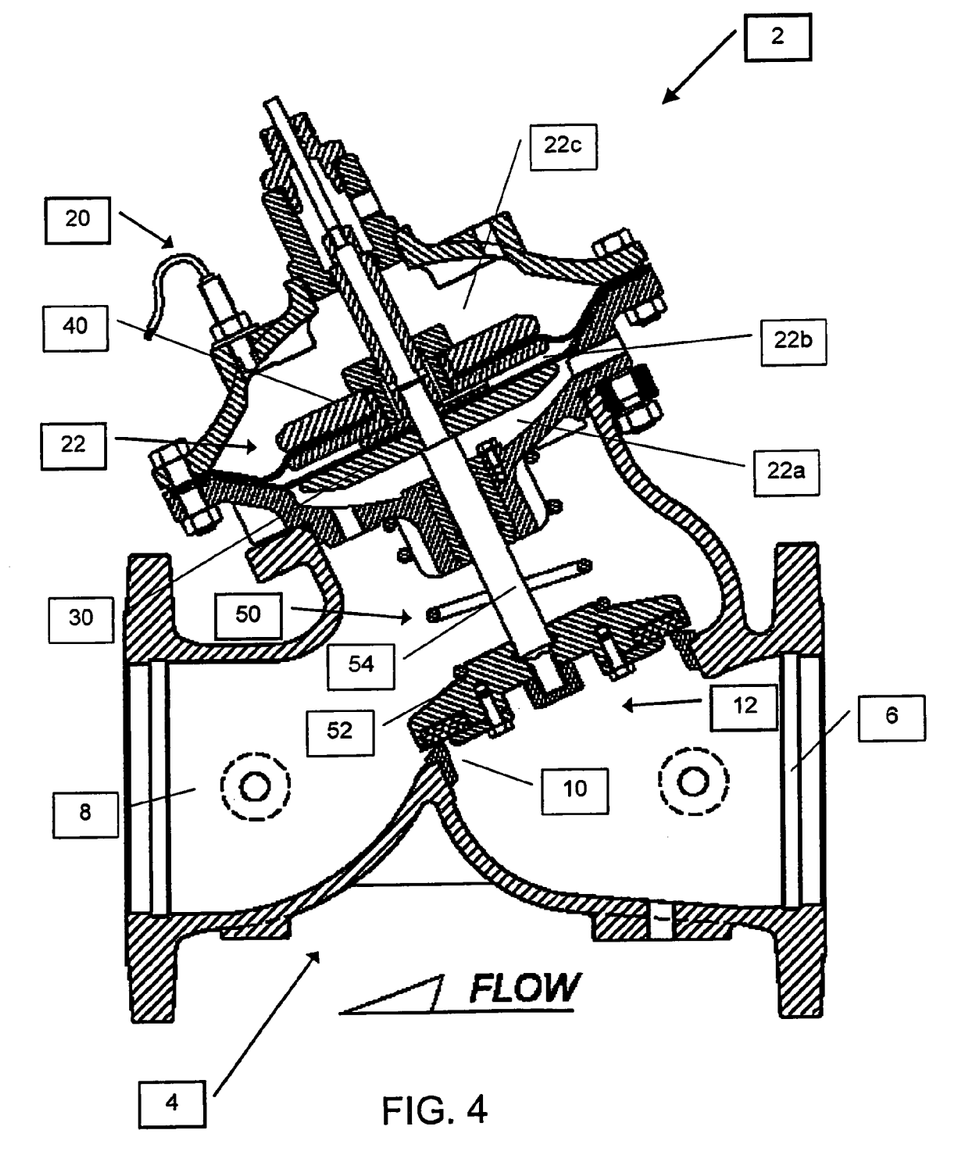
FIG. 4 is a side section of the embodiment of FIG. 1, shown here with the valve plug controlled by the secondary diaphragm actuator.

Preferably, the valve includes a primary control system configured to control the primary actuator element and a secondary control system configured to control the secondary actuator element. It should be noted that control system themselves may be of any known in the art. The primary actuator element is mechanically linked to the valve plug and regulates the flow though the valve, while the secondary actuator element remains in a fully open position. Should the primary actuator element fail to operate the valve due, for example, to diaphragm rupture, failure of the primary control system, or any other reason, the secondary control system activates the secondary actuator element, which then effects movement of the primary actuator element thereby resuming flow regulation or closure of the valve as necessary. Referring now to the drawings, FIGS. 3 and 4 illustrate features of a first preferred embodiment of the dual actuator control valve of the present invention Valve 2 includes a valve body 4 having an inlet port 6, an outlet port 8, and a valve seat 10 disposed between the inlet 6 and outlet 8 ports. The valve seat defines a valve opening 12 that permits fluid communication between the inlet 6 and outlet 8 ports. The valve 2 also includes a valve actuator housing 20 extending from the valve body 4. Preferably, the valve actuator housing 20 extends from the top of valve body 4; however, substantially any other suitable orientation is within the scope of the present invention. The valve actuator housing 20 at least partially defines a control chamber 22 that is divided into three pressure control regions 22a, 22b and 22c by the primary 30 and secondary 40 actuator elements. In this embodiment, the primary 30 and secondary 40 actuator elements are configured as diaphragm type actuator elements. Specifically, the primary actuator element 30 forms a first partition separating the first 22a and second 22b pressure control regions within the control chamber 22, and the secondary actuator element 40 forms a second partition separating the second 22b and third 22c pressure control regions within the control chamber 22. It will be appreciated that the volume of each of the three separate pressure control regions 22a, 22b and 22c is variable since the partitions, the primary 30 and secondary 40 actuator elements, separating the pressure control regions 22a, 22b and 22c, are themselves displaceable within the control chamber 22. It will be appreciated that the primary 30 and secondary 40 actuator elements have overlapping ranges of motion within the control chamber.

The primary actuator element 30 is configured to control displacement of the valve plug 50 between a closed position against the valve seat (as illustrated), and an open position spaced apart from the valve seat (not illustrated) during normal operation conditions. The valve plug 50 includes a valve seal disc assembly 52 and a valve plug shaft 54, at least a portion of which extends into the control chamber 22. The primary actuator element 30 and valve plug shaft 54 are mechanically linked such that the primary actuator element 30 directly effects displacement of the valve plug 50.

The secondary actuator element 40 is configured to remain in a fully open position during normal operating conditions. The secondary actuator element 40 sealingly circumscribes the valve plug shaft 54 so as to allow for the up and down movements of the valve plug shaft 54 during displacement of the valve plug 50.

Both the primary actuator element 30 and the secondary actuator element 40 are attached to the valve actuator housing 20 about a common periphery attachment configuration 60. In this embodiment, the common periphery attachment configuration 60 is configured such that the outer periphery of the diaphragm 32 of the primary actuator element 30, and the outer periphery of the diaphragm 42 of the secondary actuator element 40 are both attached to the valve actuator housing 20 by being clamped between the upper 24 and the lower 26 actuator housing members such that the outer periphery of diaphragm 32 and the outer periphery of diaphragm 42 are adjacent to each other.

In the embodiment illustrated in FIGS. 3 and 4, the pressure control region 22b is therefore completely enclosed by the primary actuator element 30, and the secondary actuator element 40, therefore the problem of supplying fluid pressure to pressure control region 22b arises. This problem is solved in the present invention by configuring the valve plug shaft 54 such that at least a portion of valve plug shaft 54 extends into the control chamber 22, and at least a portion of the valve plug shaft 54 is hollow so as to form at least a portion of a pressure control passage 56 configured to supply fluid pressure to pressure control region 22b.

It will be evident from FIG. 3 that displacement of the primary actuator element 30 may result in pressure outlet openings 58 being displaced into the secondary actuator element 40, therefore secondary actuator element 40 is configured with an annular recess 46 that encircles the valve plug shaft 54 and is associated with pressure control region 22b.

Therefore, depending on the position of valve plug shaft 54, pressure may be delivered to pressure control region 22b directly from pressure outlet openings 58, or from pressure outlet openings 58, through annular recess 46 and into pressure control region 22b.

It will be readily understood that pressure is supplied to pressure control region 22a through ports 70 and 72, and pressure is supplied to pressure control region 22c through ports 74. In order to seal pressure control region 22c, O-ring pressure seals 80 and 82 are employed.

Under normal operating conditions, the primary actuator element 30 is responsive to a pressure differential between the first 22a and second 22b pressure control regions within the control chamber 22, in a manner familiar in the art, and the secondary actuator element 40 is deployed in a fully open position.

In the event of a failure of the primary actuator element 30 to respond to such a pressure differential between the first 22a and second 22b pressure control regions, pressure will be directed to the third pressure control region 22c such that the bottom surface 44 of the secondary actuator element 40 abuts the upper surface 34 of the primary actuator element 30. In such a deployment both the primary actuator element 30 and the secondary actuator element 40 are responsive to a pressure differential between the first 22a and third 22c pressure control regions within the control chamber 22 (FIG. 4).

It may be apparent to one of ordinary skill in the art that the full range of displacement of primary actuator element 30 within the control chamber 22 as illustrated in FIGS. 3 and 4 is restricted by the presence of the secondary actuator element 40. Since it is an intention of the present invention to provide a dual actuator valve having dimensions that are the same as, or similar to, the dimensions of a single actuator control valve, this first preferred embodiment of the present invention is illustrated with a valve actuator housing 20 with dimensions similar to those of a single actuator control valve currently produced by the present inventor. It will be appreciated that in order to allow full displacement of primary actuator element 30 within the control chamber 22, the dimensions of valve actuator housing 20 may be altered as necessary.

Figure 5:
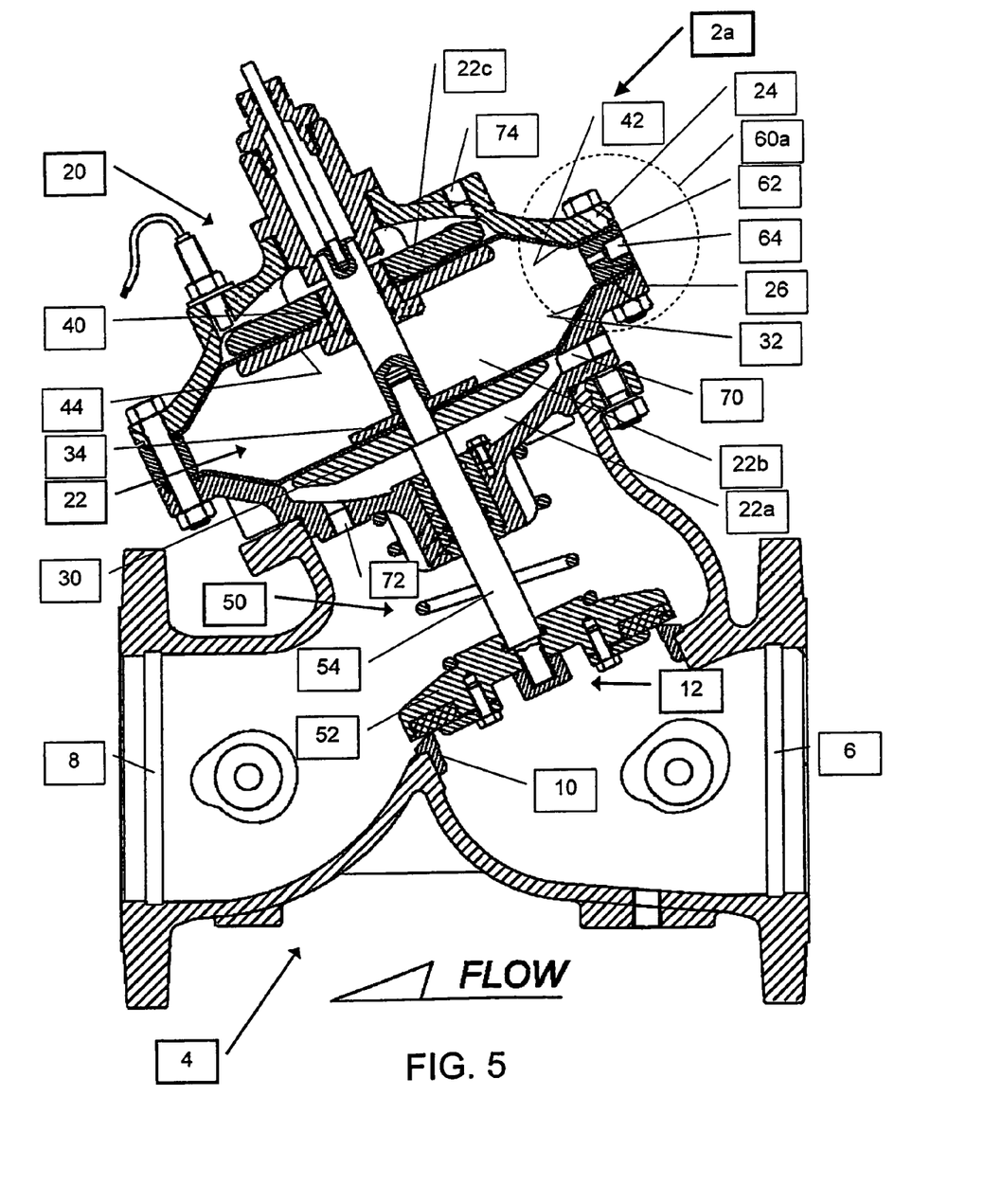
FIG. 5 is a side section of a second embodiment of a control valve with integrated dual actuators constructed and operative according to the teachings of the present invention, shown here with the valve plug controlled by the primary diaphragm actuator.

One manner of altering the dimensions of the valve actuator housing 20, among other features, is illustrated in a second preferred embodiment 2a of the present invention as shown in FIG. 5. Due to the similarity of the embodiments of FIGS. 3 and 5, similar elements are numbered the same. Here, the common periphery attachment configuration 60a includes a diaphragm spacing ring such that the outer periphery of the diaphragm 32 of the primary actuator element 30 is attached to the valve actuator housing 20 by being clamped between the upper 24 actuator housing member and the diaphragm spacing ring 62. The outer periphery of the diaphragm 42 of the secondary actuator element 40 is attached to the valve actuator housing 20 by being clamped between the lower 26 actuator housing member and the diaphragm spacing ring 62. Therefore, the outer periphery of the diaphragm 32 of the primary actuator element 30, and the outer periphery of the diaphragm 42 of the secondary actuator element 40 are spaced apart by the diaphragm spacing ring 62. The diaphragm spacing ring 62 also includes a pressure control passage 64 configured to supply fluid pressure to pressure control region 22b.

The operation of this second embodiment 2a during both normal conditions, and in the event of failure of the primary actuator element 30 to, respond, is substantially the same as described above.

Figure 6:
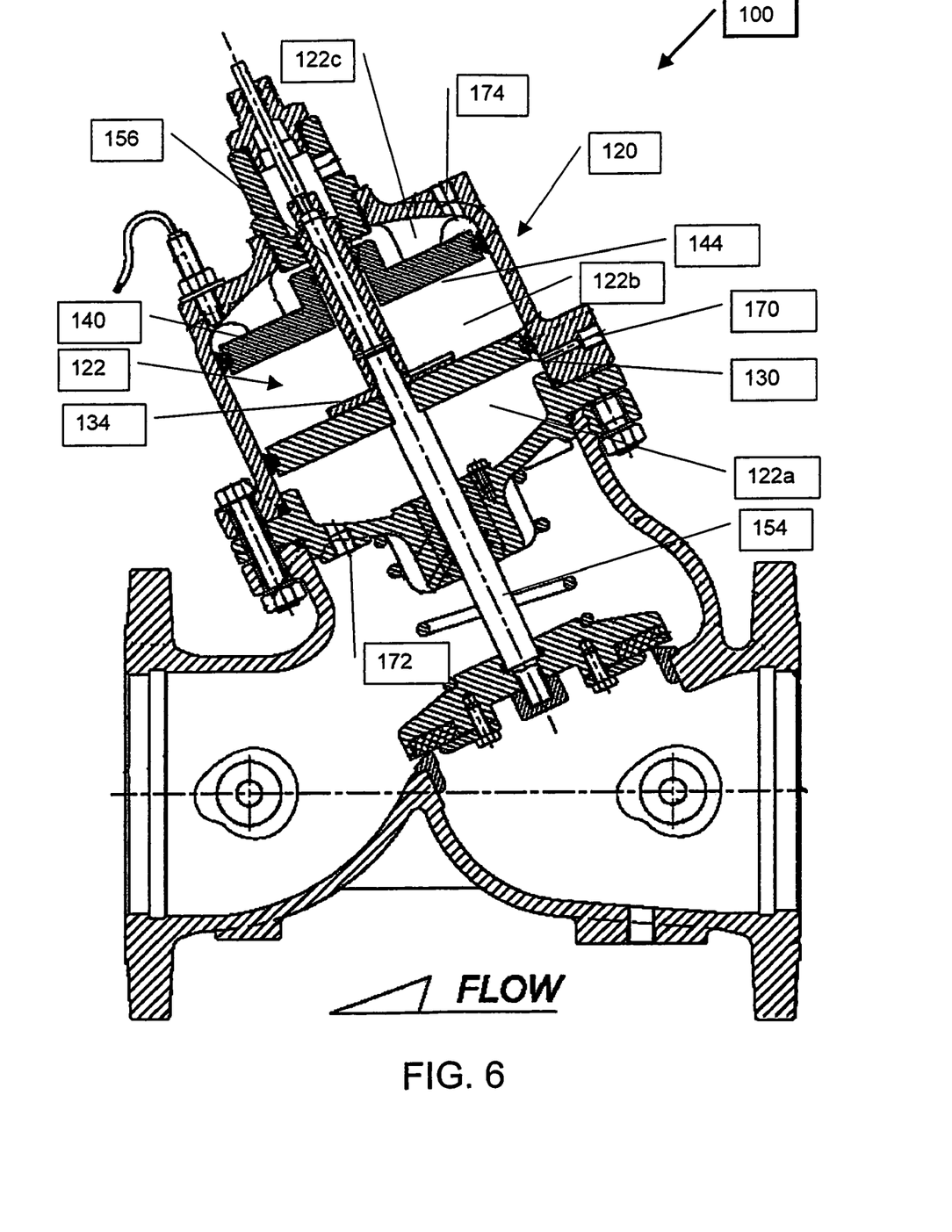
FIG. 6 is a side section of a third embodiment of a control valve with integrated dual actuators constructed and operative according to the teachings of the present invention, shown here with the valve plug controlled by the primary piston actuator.

The third preferred embodiment of the present invention 100, illustrating principles of the present invention applied to a dual actuator valve having piston type actuator elements is illustrated in FIG. 6. The actuator housing 120 encloses the single control chamber 122, which is divided into three pressure control regions 22a, 22b and 22c by the primary 130 and secondary 140 actuator elements. In this third embodiment, the primary 130 and secondary 140 actuator elements are configured as piston type actuator elements. Specifically, the primary actuator element 130 forms a first partition separating the first 122a and second 122b pressure control regions within the control chamber 122, and the secondary actuator element 140 forms a second partition separating the second 122b and third 122c pressure control regions within the control chamber 122. It will be appreciated that, here also, the volume of each of the three separate pressure control regions 122a, 122b and 122c is variable since the partitions, primary 130 and secondary 140 actuator elements, separating the pressure control regions 122a, 122b and 122c, are themselves displaceable within the control chamber 122. It will be appreciated that primary 130 and secondary 140 actuator elements have overlapping ranges of motion within the control chamber.

This third embodiment also utilizes a valve plug shaft 154 that extends into the control chamber 122, and at least a portion of the valve plug shaft 154 is hollow so as to form at least a portion of a pressure control passage 156 configured to supply fluid pressure to pressure control region 122b. It will be readily understood that pressure is supplied to pressure control region 122a through ports 170 and 172, and pressure is supplied to pressure control region 122c through ports 174.

Under normal operating conditions, the primary actuator element 130 is responsive to a pressure differential between the first 122a and second 122b pressure control regions within the control chamber 122, and the secondary actuator element 140 is deployed in a fully open position.

In the event of a failure of the primary actuator element 130 to respond to such a pressure differential between the first 122a and second 122b pressure control regions, pressure will be directed to the third pressure control region 122c such that the bottom surface 144 of the secondary actuator element 140 abuts the upper surface 134 of the primary actuator element 130, in a manner similar to the diaphragm illustration of FIG. 4. In such a deployment both the primary actuator element 130 and the secondary actuator element 140 are responsive to a pressure differential between the first 122a and third 122c pressure control regions within the control chamber 122.

It will be appreciated that the above descriptions are intended only to serve as examples and that many other embodiments are possible within the spirit and the scope of the present invention.

What is claimed is:

1. A control valve comprising:
   a) a valve body having an inlet port, an outlet port, and a valve seat disposed between said inlet and outlet ports, said valve seat defining a valve opening to permit fluid communication between said inlet and outlet ports;
   b) a valve actuator housing extending from said valve body, said valve actuator housing at least partially defining a control chamber;
   c) a valve plug displaceable between a closed position against said valve seat, and an open position spaced apart from said valve seat, at least a portion of said valve plug extending into said control chamber, said valve plug having a valve plug shaft that extends through said control chamber;
   d) a primary valve actuating element deployed within said control chamber and fixedly attached to said valve plug shaft so as to form a first partition separating first and second pressure control regions within said control chamber, said primary valve actuating element being selectively and individually actuatable so as to move said valve plug through a full range of motion of said valve plug in at least one direction between said closed position and said open position; and
   e) a secondary valve actuating element deployed within said control chamber so as to form a second partition separating said second pressure control region and a third pressure control region within said control chamber, said secondary valve actuating element sealingly circumscribing said valve plug shaft so as to allow for movements of said valve plug shaft during displacement of the valve plug when said primary valve actuating element is moving said valve plug, said secondary valve actuating element being selectively and individually actuatable so as to move said valve plug through said full range of motion of said valve plug in at least one direction between said closed position and said open position, such that said secondary valve actuating element provides back-up control, allowing full range of motion displacement of said valve plug in the event of failure of said primary valve actuating element 2. The control valve of claim 1, wherein said primary valve actuating element is mechanically linked to said valve plug, and said secondary valve actuating element is configured so as to effect movement of said primary valve actuating element when said secondary valve actuating element is activated to control displacement of said valve plug.

3. The control valve of claim 2, wherein said secondary valve actuating element is deployed in a normally open configuration until said failure of said primary valve actuating element.

4. The control valve of claim 1, wherein said primary valve actuating element is responsive to pressure differences between said first and second pressure control regions which are controlled by a primary pressure control system, and said secondary valve actuating element is responsive to pressure differences between said second and third pressure control regions which are controlled by a secondary pressure control system.

5. The control valve of claim 4, wherein said secondary pressure control system is activated upon failure of said primary pressure control system.

6. The control valve of claim 1, wherein said primary and secondary valve actuating elements are diaphragm type actuating elements.

7. The control valve of claim 6, wherein said primary and secondary valve actuating elements are attached to said valve actuator housing about a common periphery attachment configuration.

8. The control valve of claim 7, wherein said valve plug includes a said valve plug shaft at least a portion of which extends into said control chamber, and at least a portion of said valve plug shaft is hollow so as to form at least a portion of a pressure control passage configured to supply fluid pressure to said second pressure control region.

9. The control valve of claim 6, wherein said primary and secondary valve actuating elements are attached to said valve actuator housing about separate, periphery attachment configurations spaced apart by a diaphragm spacing ring.

10. The control valve of claim 9, wherein said diaphragm spacing ring includes least a portion of a pressure control passage configured to supply fluid pressure of said second pressure control region.

11. The control valve of claim 1, wherein said primary and secondary valve actuating elements are piston type actuating elements.

12. The control valve of claim 11, wherein said valve plug includes said valve plug shaft at least a portion of which extends into said control chamber, and at least a portion of said valve plug shaft is hollow so as to from at least a portion of a pressure control passage configured to supply fluid pressure to said second pressure control region.

13. A control valve comprising:
a) a valve body having an inlet port, an outlet port, and a valve seat disposed between said inlet and outlet ports, said valve seat defining a valve opening to permit communication between said inlet and outlet ports;
b) a valve actuator housing extending from said valve body, said valve actuator housing at least partially defining a control chamber having a plurality of pressure control regions; and
c) a valve plug displaceable between a closed position against said valve seat to close the valve, and an open position spaced apart from said valve seat to control flow of liquid through the valve opening so as to maintain a desired flow condition through the valve, said valve plug including a valve plug shaft that extends through said control chamber, at least a portion of which is hollow so as to form at least a portion of a pressure control passage configured to supply fluid pressure to at least one of said plurality of pressure control regions such that operational displacement of said valve plug is effected by said fluid pressure supplied through said pressure control passage;

wherein said plurality of pressure control regions are at least partially defined by a primary valve actuating element deployed within said control chamber and fixedly attached to said valve plug shaft and a secondary valve actuating element deployed within said control chamber and sealingly circumscribing said valve plug shaft so as to allow for movements of said valve plug shaft.

14. The control valve of claim 13, wherein said plurality of pressure control regions is configured as first, second and third pressure control regions within a control chamber.

15. The control valve of claim 14, wherein
a) said primary valve actuating element is deployed within said control chamber so as to form a first partition separating first and second pressure control regions within said control chamber, said primary valve actuating element configured to control displacement of said valve plug; and
b) said secondary valve actuating element is deployed within said control chamber so as to form a second partition separating said second pressure control region and a third pressure control region within said control chamber, said secondary valve actuating element configured to remain in a fully open position during normal operating conditions.

16. The control valve of claim 15, wherein said primary and secondary valve actuating elements diaphragm type actuating elements.

17. The control valve of claim 15, wherein said primary and secondary valve actuating elements are piston type actuating elements.

18. A method of displacing a valve plug deployed in a valve body, when the valve plug has a valve plug shaft that extends into a control chamber, so as to control the flow of liquid through the valve body, the method comprising:
a) dividing the control chamber into first, second and third pressure control such that said first and second pressure control regions are separated by a primary valve actuating element that is fixedly attached to the valve plug shaft, and said second and third pressure control regions are separated by a secondary valve actuating element that sealingly circumscribes the valve plug shaft so as to allow movement of the valve plug shaft;
b) actuating the valve plug with said primary valve actuating element through a full range of motion of the valve plug in at least one direction between a closed position and an open position while maintaining said secondary valve actuating element in a fully open position; and
c) actuating the valve plug with said secondary valve actuating element through a full range of motion of the valve plug in at least one direction between a closed position and an open position upon failure of said primary valve actuating element.

19. The method of claim 18, further including supplying pressure to said second pressure control region by a pressure control passage at least partially configured in the valve plug shaft.

20. The method of claim 18, wherein said dividing the control chamber is accomplished by further providing:
a) said primary valve actuating element is deployed within said control chamber so as to form a first partition separating first and second pressure control regions within said control chamber; and
b) said secondary valve actuating element is deployed within said control chamber so as to form a second partition separating said second pressure control region and a third pressure control region within said control chamber.

21. The method of claim 20, wherein said first and second valve actuating elements are diaphragm type actuating elements.

22. The method of claim 20, wherein said first and second valve actuating elements are piston type actuating elements.

* * * * *

UNITED STATES PATENT AND TRADEMARK OFFICE
CERTIFICATE OF CORRECTION

PATENT NO.        : 7,455,279 B2  
APPLICATION NO.   : 11/159186  
DATED             : November 25, 2008  
INVENTOR(S)       : Zvi Weingarten

Page 1 of 1

It is certified that error appears in the above-identified patent and that said Letters Patent is hereby corrected as shown below:

Claim 18, column 10, line 29:  
change  
--pressure control such that--  
to read  
"pressure control regions such that"

Signed and Sealed this

Twentieth Day of January, 2009

JON W. DUDAS  
*Director of the United States Patent and Trademark Office*